Jan. 11, 1955 J. H. GUENTHER 2,699,498

PULSE TIME DEMODULATOR

Original Filed March 26, 1946 3 Sheets-Sheet 1

INVENTOR
JOHN H. GUENTHER

BY D.C. Snyder
ATTORNEY

Jan. 11, 1955 J. H. GUENTHER 2,699,498

PULSE TIME DEMODULATOR

Original Filed March 26, 1946 3 Sheets-Sheet 2

INVENTOR
JOHN H. GUENTHER

BY D.B. Snyder
ATTORNEY

PULSE TIME DEMODULATOR

Original Filed March 26, 1946

3 Sheets-Sheet 3

*INVENTOR*
JOHN H. GUENTHER

BY D. C. Snyder
ATTORNEY

United States Patent Office 2,699,498

Patented Jan. 11, 1955

2,699,498

PULSE TIME DEMODULATOR

John H. Guenther, Elmont, N. Y.

Original application March 26, 1946, Serial No. 657,323, now Patent No. 2,564,687, dated August 21, 1951. Divided and this application April 19, 1951, Serial No. 221,908

11 Claims. (Cl. 250—20)

(Granted under Title 35, U. S. Code (1952), sec. 266)

This invention relates in general to electronic communication systems, in particular to pulse time modulators and detectors for such systems and is a division of my copending application Serial No. 657,323, filed ;March 26, 1946, Patent No. 2,564,687, August 21, 1951, for Pulse Time Modulation.

This invention is applicable generally to all types of communication systems and is particularly applicable to those systems which transmit intelligence by the use of pulse time modulation. The expression "pulse time modulation" as used in this specification indicates a means of communication whereby the radio carrier frequency is modulated with a series of pulses all having substantially the same amplitude and duration but being spaced one from the other by a variable time interval. This invention is applicable as a modulator for generating these variable spaced pulses and in a modified form as a demodulator for converting the pulses back to the original intelligence. In other modified forms this invention may be used as a discriminator detector for demodulating conventional frequency modulated signals, and the circuits of this invention may be used as a sweep generator for an oscilloscope or a synchroscope.

The general object of this invention is to provide new and novel circuits for use in pulse time modulation communication systems.

Another object of this invention is to provide means for generating a series of pulses having substantially constant amplitude and having the instantaneous time displacement between pulses correspond to the instantaneous amplitude of a variable amplitude voltage.

A further object of this invention is to provide means for demodulating a series of variable time spaced pulses.

A still further object of this invention is to provide new and novel circuits for demodulating conventional frequency modulated signals.

Another object of this invention is to provide new and novel means for generating a voltage having a sawtooth waveform.

Other and further objects of this invention will be apparent from the following specification when taken with the accompanying drawings in which.

The above-mentioned drawings show various modifications of the invention and illustrate its use in combination with varous systems as mentioned previously. For clarity, all similar parts of the various figures are designated by the same reference numbers. It is to be understood that the various modifications and uses described herein are representative only and that various other modifications and uses as will be apparent to those versed in the art are within the scope of this invention.

Figure 1:
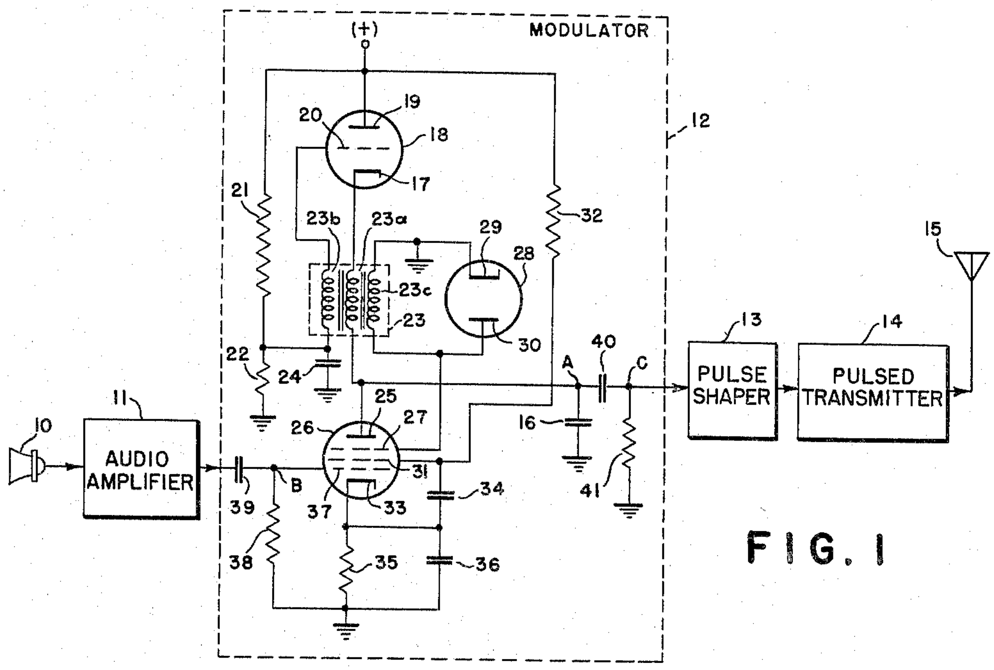
Fig. 1 is a block diagram of a typical pulse transmitter showing schematically this invention used as a modulator.

The embodiment of the invention as shown in Fig. 1 is a typical pulse time modulation communication system comprising conventional microphone 10 and audio amplifier 11; modulator 12; and conventional pulse shaper 13, pulse transmitter 14, and antenna 15. Modulator 12 converts the audio voltage from amplifier 11 into a series of pulses of constant amplitude and variable time spacing; the instantaneous time spacing between pulses being proportional to the instantaneous amplitude of the audio voltage and the rate of change of the time spacing between pulses being proportional to the frequency of the audio voltage. These pulses, after being made the proper shape and time duration by pulse shaper 13, are used to trigger transmitter 14 which generates pulses of radio frequency energy corresponding to the pulses from modulator 12. Transmitter 14 is coupled to antenna 15 which propagates these radio frequency pulses into space.

Modulator 12 comprises a pulse generator, a condenser, and an electron discharge tube arranged to produce a sawtooth voltage waveform having approximately constant amplitude and variable slope. When the modulator is first energized there is no voltage across condenser 16 and thus cathode 17 of tube 18 is at zero potential. Plate 19 is connected to the positive supply voltage and grid 20 is energized with a positive voltage from the junction of voltage divider resistors 21 and 22 and therefore current will start to flow through tube 18. To complete the electrical circuit this current flows through winding 23a of transformer 23 and charges condenser 16. This increasing current flowing through winding 23a generates a magnetic flux in the transformer which generates voltages across the terminals of the other two windings of transformer 23. Winding 23b is connected between grid 20 and the voltage divider 21—22 so that the voltage developed in the winding will add to or subtract from the normal positive voltage. Condenser 24 maintains the voltage on the divider constant and insures that the changes in voltage will be applied to grid 20. Winding 23b is wound in relation to 23a so that an increasing current through 23a will cause the potential on grid 20 to increase and cause more current to flow. Meanwhile condenser 16 charges and its potential approaches the supply potential which causes the voltage between plate and cathode of tube 18 to decrease. This continues until the potential across tube 18 becomes low enough to cause the rate of change of current through tube 18 to begin to decrease, at which time the flux in transformer 23 reverses and the potential on grid 20 decreases. Cathode 17 is now held at a positive voltage by the charge on condenser 16 and current stops flowing through tube 18. The potential across condenser 16 now is the supply voltage for plate 25 of tube 26 and condenser 16 discharges slowly through this tube, its rate of discharge depending upon the capacity of condenser 16 and the plate to cathode resistance of tube 26. As condenser 16 discharges the potential on cathode 17 of tube 18 decreases and finally reaches a value close enough to the potential on grid 20 to cause tube 18 to start to conduct. This starts the cycle again and thus a sawtooth waveform is generated across condenser 16. An idealized picture of this waveform is shown as curve I, Fig. 5.

To prevent the charging current of condenser 16 from flowing through tube 26 the third winding 23c of transformer 23 is connected between suppressor grid 27 and ground. This winding is oriented so that an increase in plate current through winding 23a develops a negative voltage on grid 27, which voltage is large enough effectively to cut off tube 26. Diode 28 is connected across winding 23c so that cathode 29 is grounded and plate 30 is connected to grid 27 of tube 26. This prevents grid 27 from going positive when tube 18 is cut off and also damps out any transient oscillations that may tend to occur in transformer 23.

Except for the plate and suppressor connections, tube 26 is connected as a conventional pentode tube with screen grid 31 energized through dropping resistor 32.

and by-passed to cathode 33 by condenser 34, with cathode 33 grounded through bias resistor 35 and condenser 36, and with control grid 37 returned to ground through resistor 38 and energized with a control voltage through blocking condenser 39. The same operation is obtained if screen 31 is energized with a fixed potential instead of through a dropping resistor and the bias may be obtained from a negative supply on grid 37. It is obvious to those skilled in the art that tube 26 need not be limited to a pentode and also that tube 26 can be cut off during the charging time of condenser 16 by methods other than the one shown.

Because the time of discharge of condenser 16 depends upon the plate resistance of tube 26 and because the plate resistance depends upon the control grid voltage, an audio voltage applied to control grid 37 will vary the discharge of condenser 16 at the applied audio rate. In operation, the free running frequency of the modulator is made higher than the highest audio frequency used by choosing the proper value for condenser 16. This allows condenser 16 to discharge at a nearly constant rate during any one cycle of operation but the discharge rate from cycle to cycle will vary with the applied audio frequency.

Figure 5:
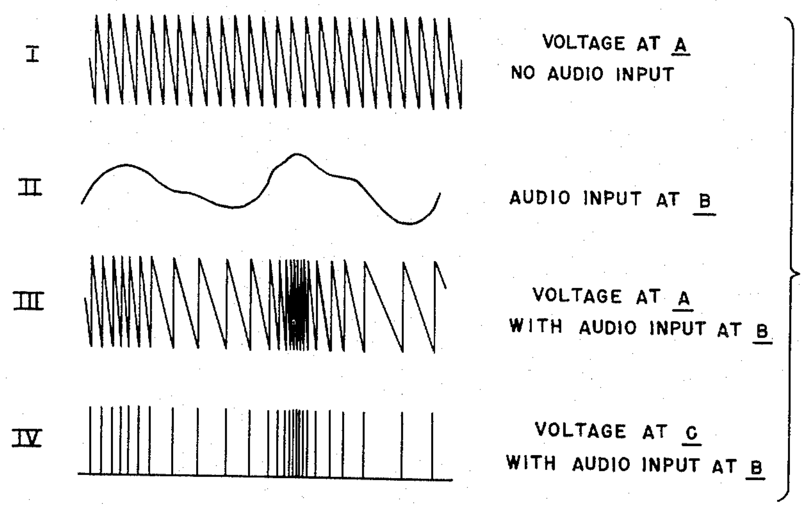
Fig. 5 shows idealized voltage waveforms of certain parts of Fig. 1.

Fig. 5 shows waveforms at various points of the circuit for an applied audio voltage. Curve II represents an audio voltage at point B, Fig. 1, and curve III represents the varying sawtooth voltage obtained at point A, Fig. 1. When this voltage is coupled through the differentiating circuit comprising condenser 40 and resistor 41 an output is obtained at point C which is a series of positive pulses of constant amplitude and variable time spacing as shown in curve IV, Fig. 5. These pulses may be used directly to pulse transmitter 14 or they may be shaped and changed in duration by shaper 13, depending upon the design requirements of transmitter 14.

The output from modulator 12 need not be taken from point C but may be taken from other points in the circuit (positive pulses are available at grid 20 of tube 18 and negative pulses are available at grid 27 of tube 26).

Figure 2:
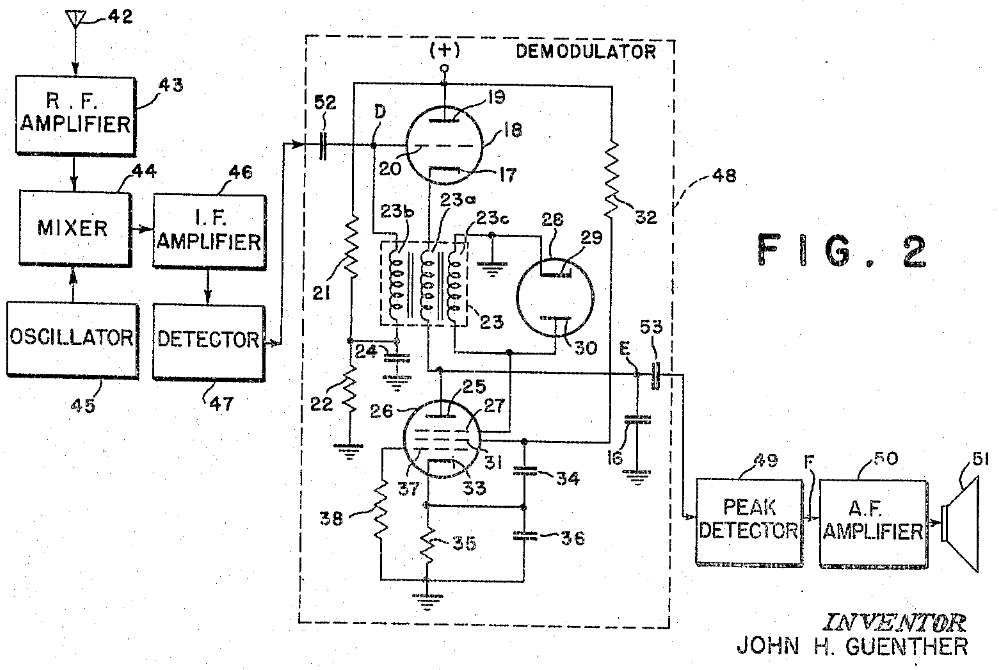
Fig. 2 is a block diagram of a typical pulse receiver showing schematically this invention used as a demodulator.

The embodiment of the invention as shown in Fig. 2 is a typical superheterodyne pulse receiver for receiving the energy broadcast by the transmitter of Fig. 1 or a similar pulse transmitter. The transmitted radio frequency pulses are picked up by antenna 42, amplified by conventional amplifier 43 and coupled to mixer 44. There the R. F. pulses are mixed with the voltage from oscillator 45 and converted to intermediate frequency pulses which are coupled to and amplified by I. F. amplifier 46. When the pulses are amplified to a convenient level they are coupled to detector 47 the output of which is a series of positive pulses similar to those produced by modulator 12 of Fig. 1. Demodulator 48 and peak detector 49 of Fig. 2 convert these pulses back into the original audio voltage which is then amplified by amplifier 50 and applied to speaker 51.

Figure 6:
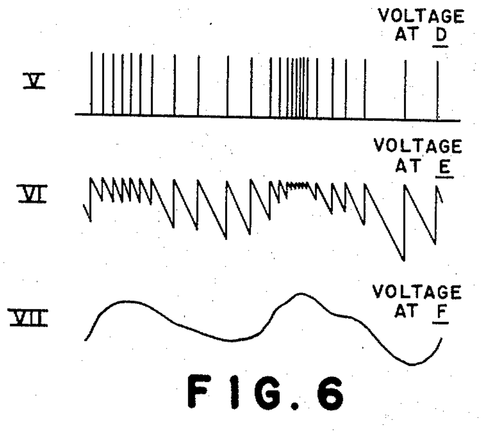
Fig. 6 shows idealized voltage waveforms of certain parts of Fig. 2.

Demodulator 48 of Fig. 2 is nearly identical with modulator 12 of Fig. 1, the main difference being the point of application of the signal voltage and the type of signal voltage applied. In Fig. 2 tube 26 has maintained a constant bias from resistor 35 and condenser 36 and therefore the rate of discharge of condenser 16 remains constant. The signal pulses from detector 47 are applied to grid 20 of tube 18 through coupling condenser 52 and each input pulse triggers the sawtooth oscillator. The normal discharge time of condenser 16 is now made longer than the longest time between any two input pulses so that the circuit normally will not trigger itself and cause spurious response. The operation is normally as explained before but now when a series of pulses, such as those represented by curve V of Fig. 6 are applied at point D, Fig. 2, the waveform of voltage across condenser 16 becomes a series of sawtooths having constant slope and varying amplitude, as shown by curve VI, Fig. 6. This voltage is applied to a conventional peak detector through coupling condenser 53 and the output from the detector is the original audio voltage, as curve VII, Fig. 6.

Figure 3:
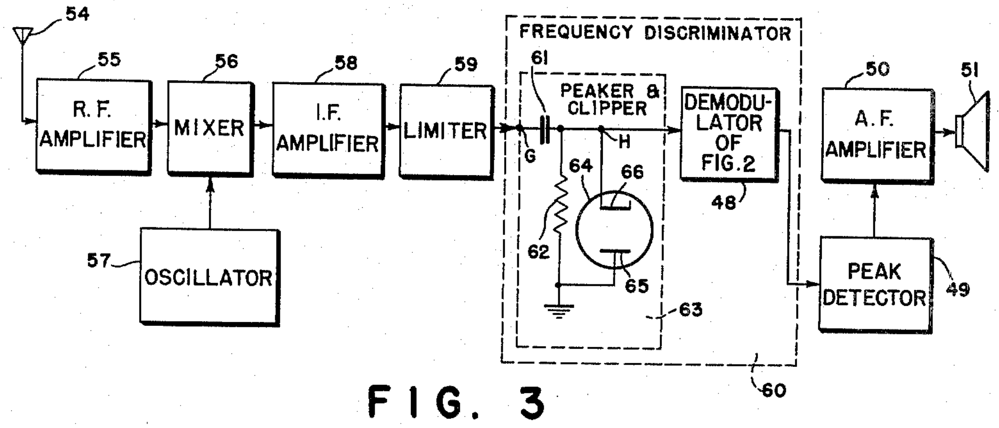
Fig. 3 is a block diagram of a typical frequency modulation receiver showing schematically this invention used as a discriminator.

Fig. 3 illustrates an embodiment of this invention in combination with conventional circuits to make a frequency modulation receiver. Conventional F. M. signals are picked up by antenna 54, amplified by R. F. amplifier 55 and coupled to mixer 56 where they are mixed with the voltage from oscillator 57 and converted to I. F. signals. These signals are further amplified by I. F. amplifier 58 and after attaining a suitable level are limited by conventional limiter circuits 59 which produce a frequency modulated square wave. These limited signals are coupled to discriminator 60 and peak detector 49 which abstract the audio components from the frequency modulator signal. The audio signal is then amplified by conventional amplifier 50 and applied to speaker 51.

Figure 7:
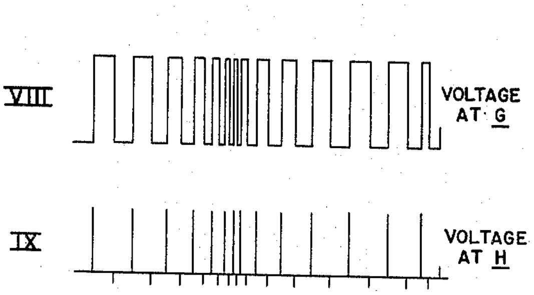
Fig. 7 shows idealized voltage waveforms of certain parts of Fig. 3.

The waveform of voltage at the input to discriminator 60 has the form shown in curve VIII, Fig. 7; that is, a frequency modulated square wave. These signals are applied to a differentiating circuit composed of condenser 61 and resistor 62 of the peaker and clipper circuit 63. Diode 64 is connected across resistor 62 so that plate 65 is grounded and cathode 66 is connected to condenser 61. The output from this circuit is a series of positive pulses, each corresponding to the leading edge of each square wave of signal. Diode 64 effectively removes the negative pulses that would be obtained at the trailing edge of each square wave. When a train of F. M. square waves such as shown in curve VIII, Fig. 7, are applied at point G of the discriminator a series of positive pulses as curve IX, Fig. 7 will be produced at point H. These pulses are coupled to the input of demodulator 48 which is the demodulator shown in Fig. 2 and as previously explained the output from peak detector 49 is then the audio component of the input signal.

Figure 4:
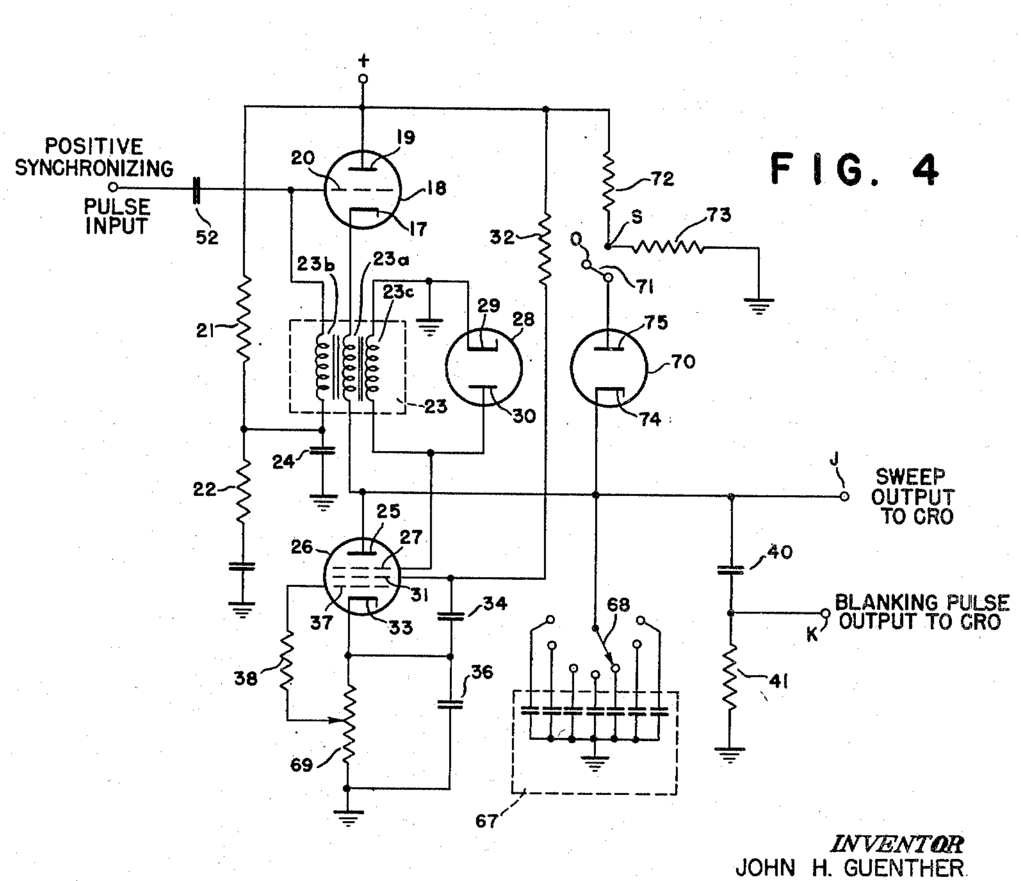
Fig. 4 is a schematic diagram of this invention showing its use as a sawtooth voltage generator.
Figure 8:
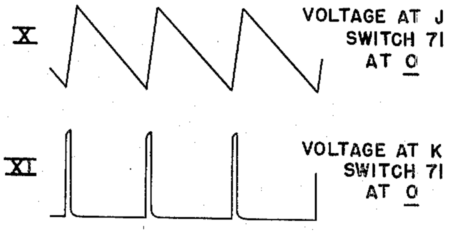
Fig. 8 and Fig. 9 show idealized voltage waveforms of certain parts of Fig. 4.

It is readily apparent from the previously described details that with a few minor changes this invention may be used as a sawtooth sweep generator for an oscilloscope or a synchroscope. As shown in Fig. 4, condenser 16 of the previous figures is replaced by the combination of condensers 67 and switch 68 and this combination constitutes a coarse frequency control for the system. To obtain a fine frequency control, the resistance of tube 26 is varied by varying the grid bias of that tube. This may be readily accomplished by substituting potentiometer 69 for resistor 35 of the previous figures. This circuit delivers a sawtooth voltage for the time base sweep at terminal J and a blanking pulse occurring during the charging time of the condenser at terminal K. Typical waveforms obtained at these terminals are shown in Fig. 8.

Figure 9:
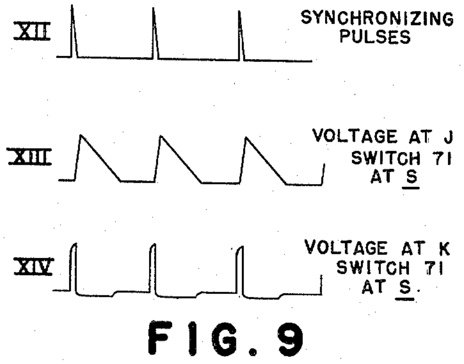

The addition of diode 70, switch 71, and the voltage divider resistors 72 and 73 convert the circuit into a sweep generator which will produce a sawtooth of voltage only when a trigger is applied to the synchronizing input terminal. Cathode 74 is connected to one side of the charging condenser as shown and plate 75 is connected to switch 71. When switch 71 is in position O, as shown, the circuit is not changed and operates in the normal fashion. When the switch is in position S plate 75 of diode 70 is connected to a positive voltage as determined by resistors 72 and 73. This voltage is made enough higher than the positive voltage on grid 20 of tube 18 to keep tube 18 cut off. When the selected condenser of bank 67 has discharged to a value such that cathode 74 is at the same potential as plate 75, the selected condenser will then charge through diode 70 at the same rate as it is discharging through tube 26 and the potential across the condenser will remain constant. As this voltage was adjusted to prevent tube 18 from conducting, no new sweep will be produced until tube 18 is fired. Typical waveforms obtained at terminals J and K with switch 71 in position S and synchronizing pulses XII, Fig. 9, applied to the synchronizing input terminal are shown as curves XIII and XIV, Fig. 9.

The invention described herein may be manufactured and used by or for the Government of the United States of America for governmental purposes without the payment of any royalties thereon or therefor.

It is not intended that this invention be limited by the above specifications but is to be limited only by the following claims.

What is claimed is:

1. Apparatus for converting frequency modulated signals to corresponding variable amplitude signals comprising means for converting said frequency modulated signals to a series of pulses, the period between said pulses corresponding to the period of said frequency modulated signals, and means for generating a recurrent sawtooth voltage waveform for converting said series of pulses to a variable amplitude voltage, each sawtooth having an approximately fixed slope and having a variable period, said last-mentioned means comprising an electronic blocking oscillator pulse generator, a condenser coupled to said generator and adapted to be charged during the period of a pulse from said generator, an electron tube coupled to said condenser and normally biased for conduction for discharging said condenser through said electron tube during the period between pulses from said generator, the rate of discharge of said condenser being fixed by the bias applied to said electron tube, means for initiating the start of each of said sawtooths of voltage coincident with each pulse of said series of pulses, means applying a voltage from said blocking oscillator to bias said tube to nonconduction during the period of a pulse from said generator and means for detecting the resulting variations in amplitude of said sawtooths of voltage.

2. Apparatus for converting frequency modulated signals to corresponding variable amplitude signals comprising means for converting said frequency modulated signals to frequency modulated square waves, means for converting said frequency modulated square waves to a series of pulses, the period between said pulses corresponding to the period of said frequency modulated signals, and means for generating a recurrent sawtooth voltage waveform for converting said series of pulses to a variable amplitude voltage, each sawtooth having an approximately fixed slope and having a variable period, said last-mentioned means comprising an electronic blocking oscillator pulse generator, a condenser coupled to said generator and adapted to be charged during the period of a pulse from said generator, an electron tube coupled to said condenser and normally biased for conduction for discharging said condenser through said electron tube during the period between pulses from said generator, the rate of discharge of said condenser being fixed by the bias applied to said electron tube, means for initiating the start of each of said sawtooths of voltage coincident with each pulse of said series of pulses, means applying a voltage from said blocking oscillator to bias said electron tube to nonconduction during the period of a pulse from said generator and means for detecting the resulting variations in amplitude of said sawtooths of voltage.

3. In combination with a radio receiver a frequency discriminator comprising apparatus for converting frequency modulated signals to corresponding variable amplitude signals, said apparatus comprising means for converting said frequency modulated signals to a series of pulses, the period between said pulses corresponding to the period of said frequency modulated signals, and means for generating a recurrent sawtooth voltage waveform for converting said series of pulses to a variable amplitude voltage, each sawtooth having an approximately fixed slope and having a variable period, said last-mentioned means comprising an electronic blocking oscillator pulse generator, a condenser coupled to said generator and adapted to be charged during the period of a pulse from said generator, an electron tube coupled to said condenser and normally biased for conduction for discharging said condenser at a constant rate through said electron tube during the period between pulses from said generator, the rate of discharge of said condenser being fixed by the bias applied to said electron tube, means for initiating the start of each of said sawtooths of voltage coincident with each pulse of said series of pulses, means for applying a voltage from said blocking oscillator to bias said tube to nonconduction during the period of said pulse from said generator and means for detecting the resulting variations in amplitude of said sawtooths of voltage.

4. In a radio receiver for a transmission system in which the radio frequency carrier is modulated by a series of constant amplitude pulses spaced one from another by a variable time interval proportional to the amplitude of the modulating signal voltage, a demodulator comprising an electronic pulse generator including an electron tube having a plate, grid, and cathode, a charging condenser coupled to said electron tube, a source of positive potential connected to said plate of said electron tube, a transformer having three windings, one winding being connected between said grid of said electron tube and a second source of positive potential, and a second winding being connected between said cathode of said electron tube and a terminal of said charging condenser, and a second electron tube of the pentode type, the plate of said pentode tube being connected to said terminal of said charging condenser, the suppressor grid of said pentode tube being connected to one terminal of a third winding of said transformer and to the plate of a diode electron tube, the other terminal of said third winding of said transformer and the cathode of said diode tube being connected to a second terminal of said charging condenser and to the cathode of said pentode tube, the screen grid of said pentode tube being energized by said first source of positive voltage, means for biasing the control grid of said pentode tube for normal conduction of said pentode tube, said three transformer windings being so oriented with each other to cause said condenser to charge and said pentode tube to be biased to nonconduction during the period of a pulse from said generator and to cause said first electron tube to deenergize during the period between said pulses from said generator and allow said condenser to discharge through said pentode tube, the rate of discharge of said condenser being fixed by said biasing means applied to said control grid of said pentode tube, means for initiating the start of each cycle of conduction of said blocking oscillator in response to a signal pulse applied from said receiver to bias said electron tube, and means for detecting the resulting variations in amplitude of said pulse generator output voltage.

5. In a radio receiver for a transmission system in which the radio frequency carrier is modulated by a series of constant amplitude pulses spaced one from another by a variable time interval proportional to the amplitude of the modulating signal voltage, a demodulator comprising, an electronic blocking oscillator, a condenser coupled to said blocking oscillator and connected to be charged during the period of a cycle of conduction of said blocking oscillator, an electron tube coupled to said condenser, means for discharging said condenser through said electron tube during the period between cycles of conduction of said blocking oscillator, means for applying signal voltages from said receiver to trigger said blocking oscillator to a cycle of conduction coincident with each received pulse, means for applying a voltage from said blocking oscillator to bias said electron tube to nonconduction during the cycle of conduction of said blocking oscillator and means for detecting the resulting variations in amplitude of said blocking oscillator output voltage.

6. In a radio receiver for a transmission system in which the radio frequency carrier is modulated by a series of constant amplitude pulses spaced one from another by a variable time interval proportional to the amplitude of the modulating signal voltage, a demodulator comprising, an electronic blocking oscillator, a condenser coupled to said blocking oscillator and connected to be charged during the period of a cycle of conduction of said blocking oscillator, an electron tube coupled to said condenser, means for discharging said condenser through said electron tube during the period between cycles of conduction of said blocking oscillator, the rate of discharge of said condenser being fixed by the bias applied to each electron tube, and means for initiating the start of each of said cycles of conduction of said blocking oscillator in response to a signal pulse applied from said receiver, and means for applying a voltage from said blocking oscillator to bias said electron tube to nonconduction during the cycle of conduction of said blocking oscillator.

7. In a radio receiver for a transmission system in which the radio frequency carrier is modulated by a series of constant amplitude pulses spaced one from another by a variable time interval proportional to the amplitude of the modulating signal voltage, a demodulator for generating sawtooth voltage waveforms, each sawtooth having an approximately fixed slope and a variable period comprising, an electronic blocking oscillator, a condenser coupled to said blocking oscillator and connected to be charged during the cycle of conduction of said blocking oscillator, an electron tube coupled to said condenser, means for discharging said condenser through said electron tube during the period between cycles of conduction of said blocking oscillator at a fixed rate determined by the bias applied to said electron tube, means for initiating the start of each cycle of conduction of said blocking oscillator in response to a signal pulse applied from said receiver, means for applying a voltage from said blocking oscillator to bias said electron tube to nonconduction during the cycle of conduction of said blocking oscillator and means for detecting the resulting variations in amplitude of said sawtooths of voltage.

8. In a radio receiver for frequency modulated signals, a demodulator comprising, means for converting said frequency modulated signals to a series of voltage pulses, the period between said pulses corresponding to the period of said frequency modulated signals, a blocking oscillator for generating a sawtooth voltage waveform for converting said series of pulses to a variable amplitude voltage, each sawtooth having an approximately fixed slope and a variable period, a condenser coupled to said blocking oscillator and connected to be charged during the period of a cycle of conduction of said blocking oscillator, an electron tube coupled to said condenser, means for discharging said condenser through said electron tube during the period between cycles of conduction of said blocking oscillator at a fixed rate of discharge determined by the bias applied to said electron tube, means for initiating the start of each cycle of conduction of said blocking oscillator in response to each of said voltage pulses, means for applying a voltage from said blocking oscillator to bias said electron tube to nonconduction during the cycle of conduction of said blocking oscillator and means for detecting the resulting variations in amplitude of said sawtooths of voltage.

9. In combination with a radio receiver, a pulse time demodulator comprising, apparatus for generating a recurrent saw-tooth voltage wave form, each saw tooth having approximately a fixed slope and having a variable period, said apparatus comprising a triggered electronic blocking oscillator pulse generator, a condenser coupled to said blocking oscillator and adapted to be charged by the conduction of said blocking oscillator to bias said blocking oscillator to nonconduction, an electron tube normally biased to conduction and coupled to said condenser for discharging said condenser at a fixed rate of discharge determined by the bias applied thereto, means for triggering said blocking oscillator in time coincidence with each received pulse, means for applying a voltage from said blocking oscillator to bias said electron tube to nonconduction during the cycle of oscillation of said blocking oscillator, and means for detecting resulting variations in amplitude of said saw tooth of voltage.

10. Apparatus for generating a recurrent saw-tooth wave form voltage comprising, in combination, a blocking oscillator tube, a storage condenser, an electron tube, said condenser being coupled at one of its terminals to said oscillator tube and said electron tube and adapted to be charged by conduction of said oscillator tube, said electron tube being normally biased to conduction for discharging said condenser at a fixed rate of discharge, means for applying pulses of constant amplitude and variable time spacing to said oscillator tube to trigger said oscillator tube, and means for applying a voltage to said electron tube to bias said electron tube to nonconduction only during the cycle of oscillation of said oscillator tube, whereby said condenser is alternately charged and discharged and the wave form of voltage across said condenser becomes a series of saw tooths having constant slope and varying amplitude.

11. Apparatus for converting frequency modulated signals to corresponding variable amplitude signals comprising, means for converting said frequency modulated signals to a series of pulses, the period between said pulses corresponding to the period of said frequency modulated signals, a blocking oscillator tube, a storage condenser coupled to said oscillator tube and adapted to be charged during conduction of said oscillator tube, an electron discharge device connected to said oscillator tube and said storage condenser, said electron discharge device being normally biased to conduction and adapted to discharge said condenser at a constant rate while in the conductive state, means for applying said pulses to said oscillator tube to trigger said oscillator tube, means for applying a voltage from said oscillator tube to said electron discharge device to bias said discharge device to nonconduction during the cycle of oscillation of said oscillator tube to permit said condenser to become charged, said condenser during conduction of said oscillator tube being adapted to acquire a charge sufficient to bias said oscillator tube to nonconduction, whereby the wave form of voltage appearing across said condenser is a series of saw tooths having constant slope and varying amplitude, and means coupled to said condenser for detecting the variations in amplitude of said saw-tooth voltage.

References Cited in the file of this patent

UNITED STATES PATENTS

| | | |
|---|---|---|
| Re. 23,288 | Krumhansel et al. | Oct. 24, 1950 |
| 2,418,825 | Engstrom | Apr. 15, 1947 |
| 2,438,908 | Goodall | Apr. 6, 1948 |
| 2,500,536 | Goldberg | Mar. 14, 1950 |
| 2,522,110 | Forster | Sept. 12, 1950 |
| 2,564,687 | Guenther | Aug. 21, 1951 |